Jan. 23, 1968          J. FRAY          3,365,368

NUCLEAR TELESCOPICALLY ARRANGED REACTOR CONTROL ELEMENTS

Filed July 20, 1965          3 Sheets-Sheet 1

Jan. 23, 1968          J. FRAY          3,365,368
NUCLEAR TELESCOPICALLY ARRANGED REACTOR CONTROL ELEMENTS
Filed July 20, 1965          3 Sheets-Sheet 2
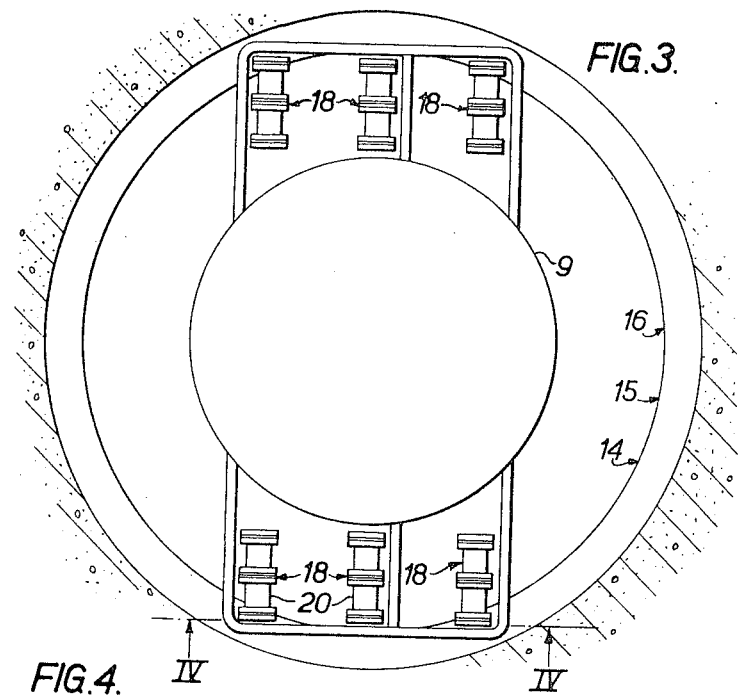
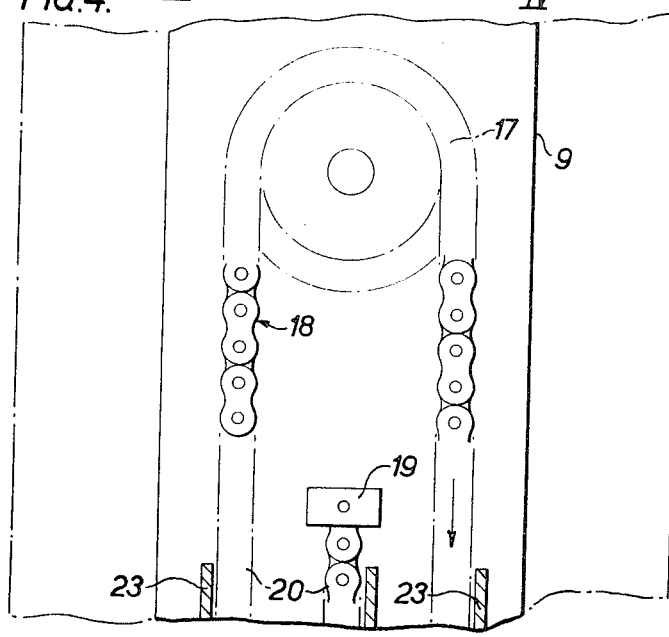

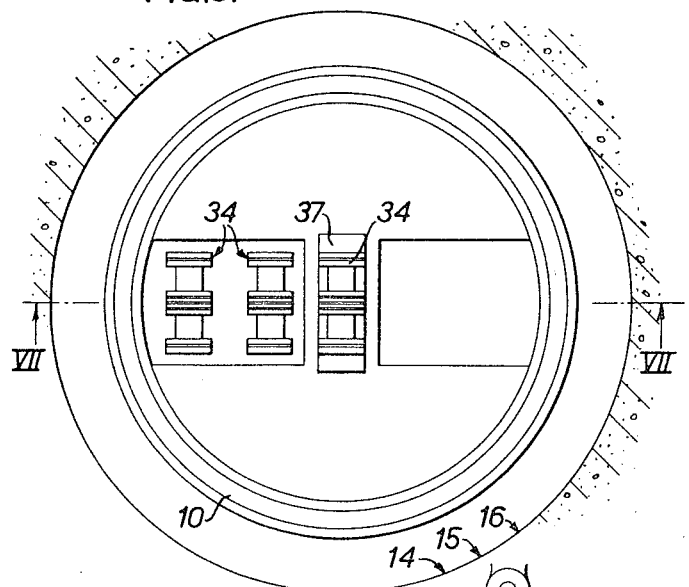
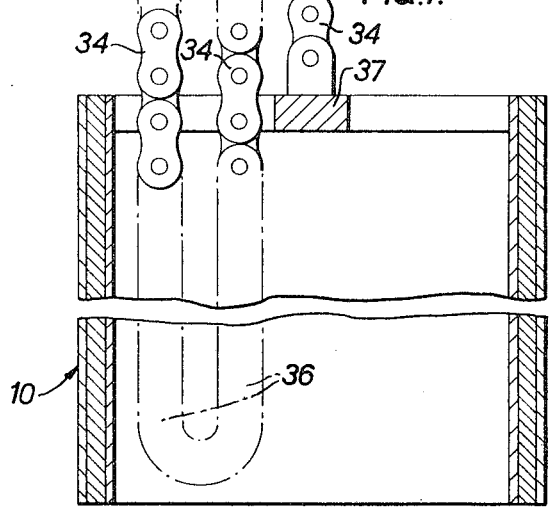

United States Patent Office 3,365,368
Patented Jan. 23, 1968

3,365,368
TELESCOPICALLY ARRANGED NUCLEAR
REACTOR CONTROL ELEMENTS
Joseph Fray, Culcheth, Warrington, England, assignor to United Kingdom Atomic Energy Authority, London, England
Filed July 20, 1965, Ser. No. 473,383
1 Claim. (Cl. 176—35)

ABSTRACT OF THE DISCLOSURE

A nuclear reactor having a reactive core with reactivity control apparatus for axially positioning the reactivity control elements which comprise: a first group of large neutron absorbancy elements, e.g., normal start-up and normal and safety shut-down elements; an additional group of reduced neutron absorbancy elements, e.g., auto-control and xenon over-ride elements. Each element of the additional group is arranged telescopically with an element of the first group. The axial position of the elements of the additional group is controllable dependent upon control of the position of the elements of the first group, the latter being independently movable when the elements of said additional group are fully inserted in the core.

---

Figure 1:
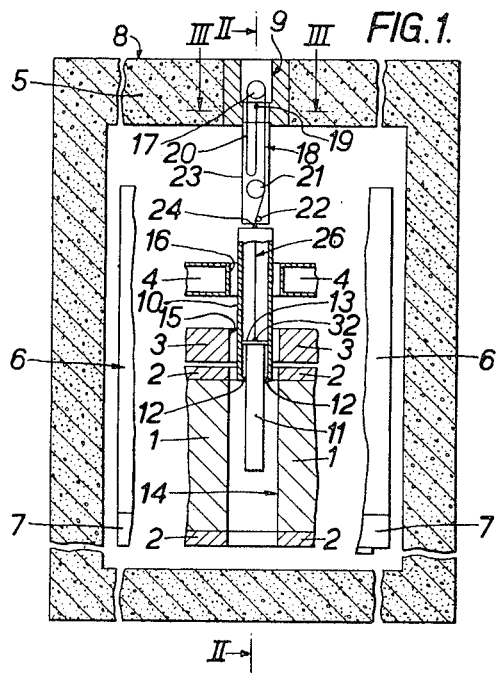

This invention relates to the control of nuclear reactors.

A nuclear reactor under steady state conditions achieves, after a few days of operation, a situation in which the production and destruction of the fission product xenon in the fuel are roughly equal. This steady state value of xenon takes up a certain amount of the reactivity available, the "poisoning" effect being allowed for in the designed core reactivity which determines the fuel enrichment. The xenon is formed principally by the decay of $I_{135}$ to $Xe_{135}$ and is destroyed both by neutron capture and by a relatively slow $\beta$ decay mechanism.

However, when the reactor is shut down, the formation of Xe from I continues whilst the destruction by neutron capture ceases. The nett effect is that the concentration of Xe increases for a period after shut-down and after reaching a peak value begins to fall off. The time for the Xe concentration to return to the equilibrium value may be as much as 30 hours. If it is required to re-start the reactor during this period, extra reactivity, known as "xenon over-ride," must be available. The other alternative, never shutting down the reactor, is not practicable even with on-load refuelling, because there must be provision for shutting down the reactor for planned and unplanned maintenance. It follows that reactivity in excess of normal full power requirements must be built into the core to cater for short term load reductions and spurious shut downs, together with a further margin for auto-control purposes, where this form of control is provided.

The excess reactivity built into a nuclear reactor requires a control system of sufficient capacity to reduce the neutron reproduction ratio within the reactor to below unity under all conditions. This control system must be of sufficient capacity to hold under control the excess reactivity provided for fuel depletion, temperature effects and for fission product build up, including the provision for xenon over-ride.

It is desirable however to maintain the control system of a reactor at as small a capacity as is consistent with safety, since a control system employing a large number of control elements requires a large number of openings in the pressure vessel of the reactor and complicates its overall construction.

Hitherto the practice has been to employ in a control system a number of control elements the axial position of which in relation to the core serves to determine the reactivity balance of the reactor at all times. These control elements may be placed in two groups, (a) those normally held out of the core under full power equilibrium operation and (b) those which remain deeply inserted at this condition. Group (a) includes any special safety absorbers together with those required to control the reactor from normal start-up to full power equilibrium, while group (b) comprises the absorber elements required for xenon over-ride and auto-control. Auto-control consists of some or all of the group (b) control elements having their movement of insertion into or removal from the core determined by a servo-mechanism controlled by varying reactor parameters. Xenon over-ride is obtained following a load reduction or spurious shut-down by removing from the core those absorber elements of group (b) which were inserted at full power to balance the excess reactivity provided. Because of the restriction on the total number of absorber element positions available it would normally be essential to use a relatively small number of elements for the xenon over-ride and auto-control functions, and this leads to elements of relatively large neutron absorbancy. A more ideal employment would be to have more control elements each of less absorbancy and disposed in a more dispersed pattern in relation to the core so that power losses due to local flux depressions and poor radial flux shaping are reduced compared with the case of few control elements of large absorbancy.

However, the provision of sufficient extra control elements in accordance with the aforementioned more ideal situation would in the normal way necessitate the provision of extra control channels in the core, to the detriment of fuel investment therein and with the need for extra fuel to compensate for the loss, and would also necessitate an increased number of reactor vessel penetrations for the extra control element operating mechanisms. In the case particularly of the employment of pre-stressed concrete pressure vessels, and also to a somewhat lesser extent where a steel pressure vessel is employed, extra penetrations involve a penalty in vessel wall thickness. With a concrete vessel, extra penetrations can involve interference with optimum pre-stressing tendon and refuelling standpipe cooling tube disposition.

It is therefore an object of the present invention to provide a control system which caters more ideally than hitherto for xenon over-ride and in which the said disadvantages of the aforementioned more ideal solution to the xenon over-ride problem are wholly or largely overcome, without adversely affecting the normal functioning of the control system in controlling reactivity and effecting rapid shut-down when required.

According to the invention, a nuclear reactor has control elements of large neutron absorbancy for normal control and shut-down functions, and has, additional to at least some of said control elements of large neutron absorbancy, control elements of reduced neutron absorbancy and intended for deep insertion in the reactor core during full-power operation for controlling the excess reactivity provided for xenon override and for operation by auto-control where provided, each additional control element being in co-positional relationship with a control element of large neutron absorbancy.

Preferably, the control elements of large neutron absorbancy are tubular and of sufficient wall thickness as to absorb substantially all neutrons of thermal energy, and the control elements of reduced neutron absorbancy can fit within the bore of such of the tubular control elements with which they are co-positional.

The axial position of the two kinds of control element may either be independently controllable or be determined by controlling the axial position of the outer control elements only.

Where the inner control elements are independently controllable, these control elements are most suited for use in auto control of the reactor since fine control is readily achievable for any position of the outer control elements of large neutron absorbancy.

The invention is advantageous in that a more efficient core utility results in which fewer control absorber element positions permit greater flexibility for flux shaping purposes, thus allowing a saving in core channels and fuel. Additionally a larger number of auto-control elements is afforded, thereby providing a more effective control system which is inherently more safe due to the reduced reactivity worth of individual auto-control elements.

Figure 2:
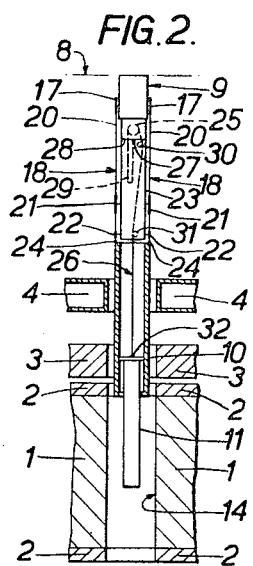
Figure 5:
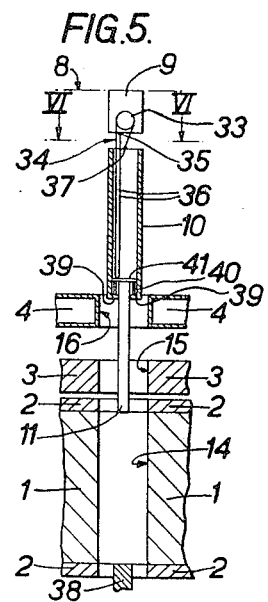

Constructions embodying the invention will now be described by way of example with reference to the accompanying drawings in which like reference numerals indicate like parts, and wherein:

FIGURE 1 is a diagrammatic view of a nuclear reactor embodying a control system according to the invention and illustrates a first construction, FIGURE 2 is a fragmentary view in section on line II—II of FIGURE 1, FIGURE 3 is an enlarged plan view on line III—III of FIGURE 1, FIGURE 4 is a view in section on line IV—IV of FIGURE 3, FIGURE 5 is a fragmentary elevation and illustrates a second construction, FIGURE 6 is an enlarged plan view in section on line VI—VI of FIGURE 5, and FIGURE 7 is a view in section on line VII—VII of FIGURE 6.

Referring to FIGURES 1–4 of the drawings, in the construction shown therein, a pressurised gas-cooled, graphite moderated nuclear reactor comprises a core 1 with reflector 2 and surmounted by a neutron shield 3 and hot coolant manifold 4 all contained within a pressure vessel 5 which also contains heat exchangers 6 and coolant circulator 7 for producing flow of coolant along vertical fuel element channels (not shown) in the core 1, to the manifold 4, to the heat exchanger 6 where the coolant gives up its heat, and back to the core 1 for flow along the fuel element channels therein. In the drawings, the core 1, reflector 2, neutron shield 3, manifold 4, vessel 5, heat exchangers 6, and circulators 7 are all shown fragmented. Refuelling is performed from refuelling floor level 8, and at this level are also disposed the accessible units for the control system of the reactor, one of such units being illustrated diagrammatically in FIGURE 1 and designated 9. This consists of a combined vessel plug and winding unit and embodies its own electric motors. The control elements associated with each control position comprise a tubular control member 10 of normally large thermal neutron absorbancy ("black") and, typically, for a 100 mw.(e) nuclear power station, of about 6″ diameter and 26 ft. length and fabricated from 4% boron steel sleeves each about 0.25″ wall thickness and contained within a stainless steel tubular case, and a solid or tubular control rod 11 of diameter about 2½″–3″ and length 26 ft., of stainless steel, and of reduced thermal neutron absorbancy ("grey") disposed within the tubular member 10 with ample clearance so as to be readily axially slidable therein and to obviate any possibility of the rod jamming within the member 10. The latter is provided with an annular lip 12 at its lower end to co-operate with a circular plate 13 at the top of the rod 11 so as to make it impossible for the rod 11 to leave the lower end of the tubular member 10 and possibly interfere with rapid insertion of the latter into the reactor core 1. It is possible to provide an alternative arrangement (not shown) for preventing separation of the member 10 and rod 11 by providing upper and lower stops to limit axial movement of the member 10 and rod 11 respectively and to ensure by choice of the lengths of member 10 and rod 11 that there is no separation at the limiting position defined by the stops.

It will be appreciated from FIGURE 1 that a control element channel 14 is provided in the core 1 and reflector 2 and that aligned apertures 15, 16 are provided in the neutron shield 3 and manifold 4, respectively, in respect of each vessel 5 penetration which houses a unit 9. Each unit 9 includes mechanism for separate control of the amount of insertion into or withdrawal from the channel 14 of both the tubular member 10 and the rod 11. The mechanism for controlling member 10 is shown particularly in FIGURES 1, 2, 3 and 4. This comprises a pair of winding sprockets 17 driven by a reversible electric motor (not shown) within the casing of unit 9, chains 18 fixed at their upper ends 19 to the casing of unit 9 and having slack loops 20, passing over the sprockets 17, round pairs of guide sprockets 21 and 22 journalled in a casing 23 depending from the unit 9, and secured at their lower ends 24 to the upper end of member 10. The rod 11 is controlled (see FIGURE 2) by a sprocket 25 disposed with its axis at right angles to that of sprockets 17 and driven by a reversible electric motor (not shown) within the unit 9 and controllable independently from the motor driving the sprockets 17, and a chain 26 disposed within the casing 23 and fixed at its upper end 27 to the underside of unit 9, having a slack loop 29, passing over the sprocket 25 and round guide sprockets 30 and 31 journalled in the casing 23, and secured at its lower end 32 to the top of the rod 11. It will be appreciated that control of the rod 11 is independent of that of the member 10 except insofar as the rod 11 cannot be lowered completely out of the member 10.

In an alternative construction, illustrated in FIGURES 5, 6 and 7, the construction is similar to that shown in FIGURES 1–4 except that the control for positioning the tubular control member 10 and control rod 11 is effective only on the former and is therefore simpler in construction. It comprises a sprocket 33 within the unit 9′ and driven by a reversible electric motor (not shown), and a chain 34 anchored at one end 35 to the underside of the unit 9′, provided with a slack loop 36, passing over the sprocket 33 and anchored at its other end 37 to the tubular member 10. In this construction, the rod 11 depends from the member 10 at all times when the member 10 is out of register with the core; as the tubular member enters the core, the rod 11 is prevented from further downward movement by a stop 38 and the member 10 can move downwardly over it until in the position of full insertion of the member 10 into the core 1, the rod 11 is nearly wholly therewithin. Withdrawal of the member 10 leaves the rod 11 in its position of full insertion in the core 1 until the member 10 picks up the rod 11 by virtue of the engagement of an annular lip 39 thereon with distance piece 40 engaging a circular flange 41 at the top of the rod 11, until the uppermost position of the tubular member 10 (as shown in FIGURE 5) has caused complete withdrawal of the rod 11 from the core 1.

It will be appreciated that both constructions allow the rods 11 to be left in the core during prolonged full power operation, their withdrawal following a load reduction permitting the "release" of built-in reactivity to provide xenon over-ride whilst not prejudicing the use of the main control elements—tubular members 10—in case of a fault shut-down. The first-described construction allows the use of some or all of the control rods 11 for auto control of the reactor without restriction, whereas the second-described construction allows auto-control employing the rods 11 only after complete withdrawal from the core of the tubular members 10.

I claim:

1. A nuclear reactor having a core; a first group of control elements of large neutron absorbancy material which are axially movable within, and withdrawable from, control channels in said core; an additional group of control elements which are axially movable within, and withdrawable from, said control channels, the elements of said additional group being of reduced neutron absorbancy material compared with that of the control elements of said first group, said additional control elements each being telescopically arranged with a control element of said first group; means for controlling the axial position of the elements of said first group; and structural means effective at least at times to control the position of the elements of the additional group dependent upon the position of the elements of said first group, said last named elements being capable of independent insertion into, and withdrawal from, said core while the elements of said additional group are fully inserted in the core.

References Cited

UNITED STATES PATENTS

| | | | |
|---|---|---|---|
| 2,852,458 | 9/1958 | Dietrich et al. | 176—35 |
| 2,987,455 | 6/1961 | Huston et al. | 176—86 |
| 3,212,981 | 10/1965 | Tollet et al. | 176—86 |
| 3,227,624 | 1/1966 | Lechevallier | 176—86 |

FOREIGN PATENTS

| | | |
|---|---|---|
| 1,049,014 | 1/1959 | Germany. |
| 1,322,339 | 2/1963 | France. |
| 1,356,074 | 2/1964 | France. |

L. DEWAYNE RUTLEDGE, *Primary Examiner.*

CARL D. QUARFORTH, BENJAMIN R. PADGETT,

*Examiners.*

H. E. BEHREND, *Assistant Examiner.*